Feb. 11, 1964

M. P. ESKIN ETAL 3,121,211

HYDROPHONE TESTING TANK

Filed June 6, 1960

INVENTORS.
MILES P. ESKIN
HENRY GERBER
MARVIN S. WEINSTEIN
BY W. O. Quesenberry
O. E. Hodges
ATTYS.

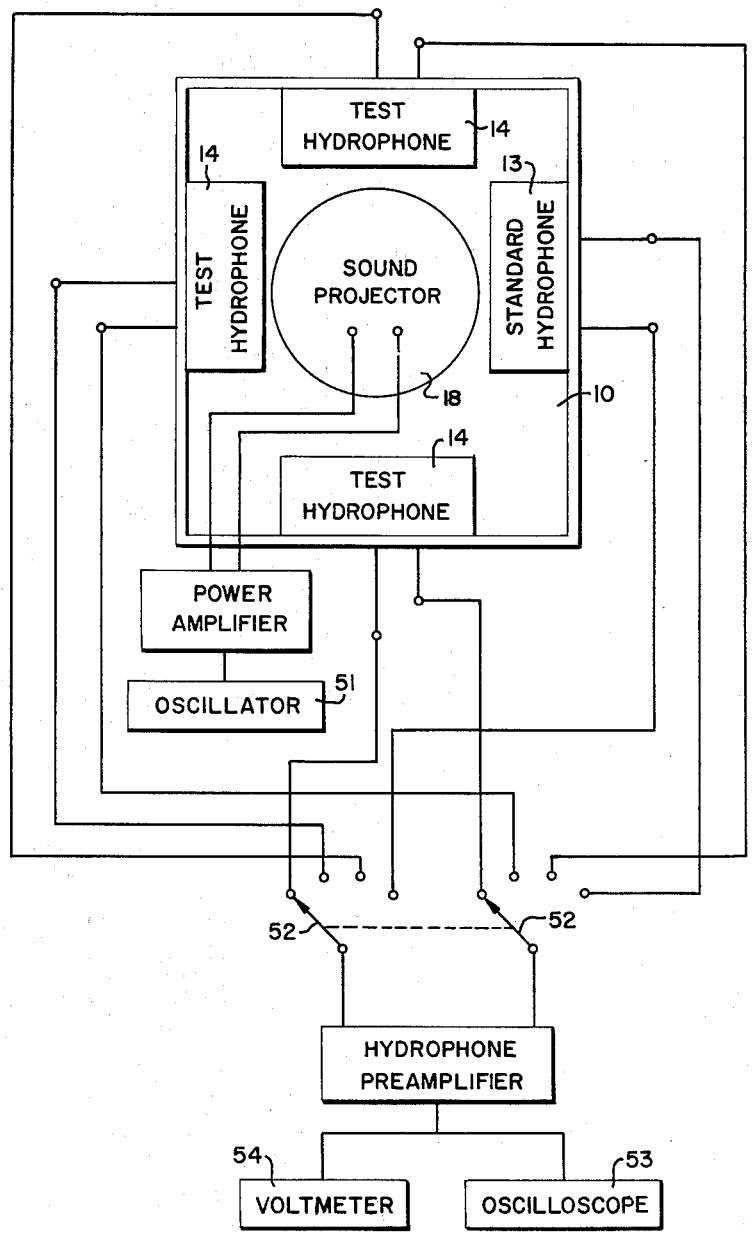

United States Patent Office 3,121,211
Patented Feb. 11, 1964

3,121,211
HYDROPHONE TESTING TANK
Miles P. Eskin, Silver Spring, Md., Henry Gerber, Washington, D.C., and Marvin S. Weinstein, Silver Spring, Md., assignors to the United States of America as represented by the Secretary of the Navy
Filed June 6, 1960, Ser. No. 34,344
3 Claims. (Cl. 340—8)
(Granted under Title 35, U.S. Code (1952), sec. 266)

The invention described herein may be manufactured and used by or for the Government of the United States of America for governmental purposes without the payment of any royalties thereon or therefor.

This invention relates to a system to study the response of underwater hydrophones and to subject the hydrophones to simulated conditions corresponding to conditions existing at sea bottom and to subject the hydrophones to continuous test for long periods of time.

Hydrophones which serve to initiate a mine explosion are immersed for long periods of time and must be as ready to function after this long submersion as they function during the test. It is therefore necessary to test these hydrophones for long periods of time under conditions simulating the conditions which exist at the bottom of the sea. These hydrophones are actuated by vibrations in the water of the type generally known as sound waves such as are generated by ships' propellers, motors, or some other identifiable sound and are generally of a low frequency.

The principal object of the invention is to provide apparatus which will subject hydrophones to conditions simulating the conditions existing at sea bottom and at a depth at which mines are planted, to provide a continuous comparative record with a standard, calibrated hydrophone which is being subjected simultaneously to the same conditions as the hydrophones being tested, and to provide means for measuring acoustic, electronic and physical characteristics of the hydrophones being tested.

Another object of the present invention is to provide an apparatus for testing hydrophones under conditions simulating conditions existing at sea bottom which apparatus will automatically compensate for changes in temperature and barometric pressure, maintaining, without constant attention, those conditions which are originally set up in the apparatus.

A further object of the present invention is the provision of manually operated means within the hydrophone testing apparatus for supplementing the automatic simulated condition maintaining devices to assist the automatic devices in maintaining the simulated conditions when changes occur which are without the scope of the automatic devices.

A still further object of the invention is the provisions of means supporting and isolating the testing apparatus from interfering vibrations which might completely alter the results obtained.

Other objects and many of the attendant advantages of this invention will be readily appreciated as the same becomes better understood by reference to the following detailed description when considered in connection with the accompanying drawings wherein:

FIG. 3 is a wiring diagram.

Figure 1:
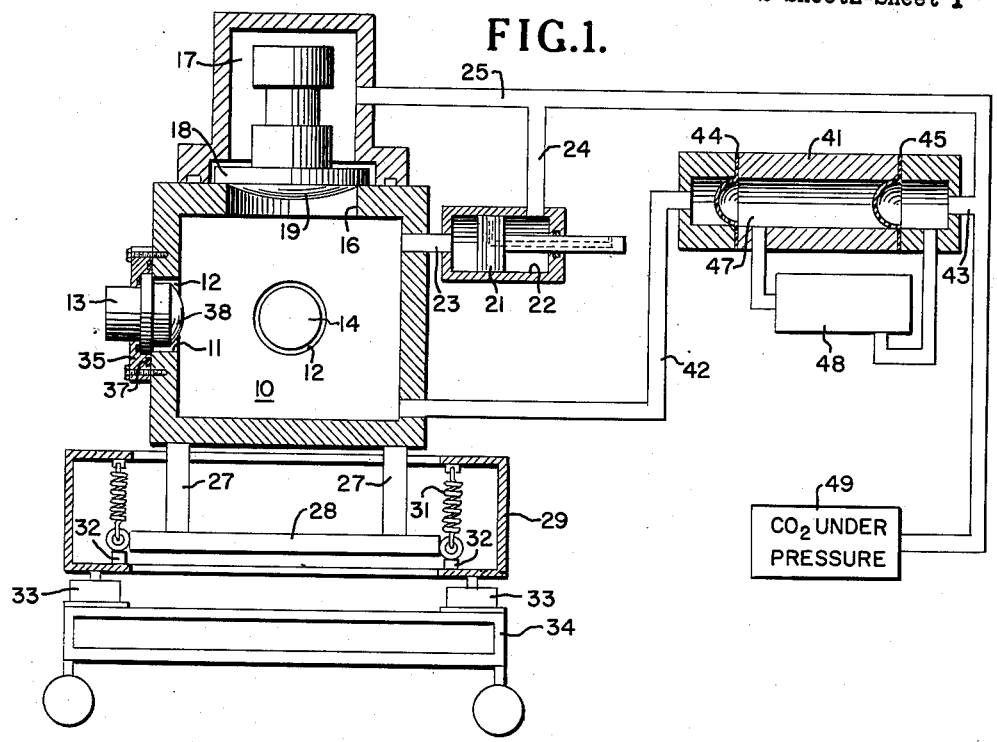
FIG. 1 is a diagrammatic view of the testing apparatus.

Referring to the drawings wherein like parts are designated by the like numerals, the apparatus is diagrammatically illustrated, because the invention is in the system and the means for simulating conditions which exist on the bottom of the sea, all of which may be adequately set forth by the diagrammatic illustration rather than by structural detail.

The main component of the testing apparatus is a substantially cubically-shaped tank 10 having four openings 11 in the four sides, which communicate with compartments 12 in which are housed respectively, a standard calibrated hydrophone 13, the response of which to acoustic signals is virtually independent of water depth and the voltage output thereof is constant for any intensity of sound regardless of the frequency of the sound, and three hydrophones 14 to be tested under conditions simulating those which exist at seat bottom and compared with the standard hydrophone 13. The testing tank is also formed with an opening 16 in the top side, which communicates with compartment 17, housing a low frequency speaker 18 which serves as a source of sound vibrations.

The compartment 17 in which the speaker is mounted is separated from the water filled tank 10 by a diaphragm 19 supported in the opening 16 of the top side of the tank. The compartment 17 is filled with a gas ($CO_2$), under pressure when the apparatus is functioning, which establishes the pressure of the tank. A manually controlled piston 21 mounted for reciprocation in a cylindrical chamber 22 is connected, at the head end of the piston, to the tank 10 by pipe 23 and to the gas pressure sub system by pipe 24. The gas pressure sub system is connected to the compartment 17 through pipe 25.

The tank 10 stands on its legs 27 and is supported on the platform 28, which is in turn suspended from the frame 29 by coil springs 31. The points of spring suspension of the platform rest on the rubber cushions 32. The frame 29, which carries the platform is supported on shock mounts 33 secured to a mobile cart 34. The tank, supported in this manner is substantially free of vibration caused by physical disturbances such as adjacent motors, large vehicular traffic causing building vibration or the like.

The compartments 12 are formed as shown in FIG. 1 with a cap plate 35 into which hydrophones 13 and 14 are threaded or otherwise mounted in a sealed manner. The cap plates 35 are sealed to the tank through the use of O-rings 37. Projecting into the tank, the diaphragm 38 of the hydrophones receive any vibrations which are present in the water of the tank.

A pressure equalizer 41, the specific details of which are the subject of a copending application filed July 11, 1960, Serial No. 42,185, is connected between the sealed water sub system and the pressurized gas sub system, both sub systems together providing the conditions used in the testing apparatus. This pressure equalizer which is set forth in detail in the copending application is here described briefly. A Lucite or clear plastic vessel 41 is connected at one end to the water sub system through pipe 42 and at the other end to the pressurized gas sub system through pipes 43. Flexible diaphragm 44, which may be referred to as the water diaphragm, and diaphragm 45 which may be referred to as the gas diaphragm, seal a central chamber 47 away from the ends. These diaphragms are dome-shaped and when the apparatus is operating are normally in phase with the convex sides of the diaphragms toward the same direction substantially as shown.

A piston in the cylinder 48, manually operated, is used to restore the flexible diaphragms into in phase position without any resulting change in pressure in the water filled sub system, should the gas diffusion through the diaphragm from the pressurized gas sub system on one side and the water vapor diffusion from the central chamber be sufficient to place the flexible diaphragms in out of phase position, as set out specifically in the above referred to application.

The central chamber 47 is filled with a barium hydroxide saturated solution which combines with $CO_2$ and precipitates to prevent any $CO_2$ which might diffuse through the diaphragm 45 from entering the water filled sub system. The movement of the dome-shaped flexible diaphragms from one extreme position to the other will account for a volumetric change in the water filled system, a change of approximately two hundred thirty-one cubic centimeters having been found satisfactory for the purpose. Larger changes of volume capacity may be compensated for without any resulting change in pressure in the water filled sub system by adjusting the piston 21.

The pressure in the gas filled sub system is obtained and held at a constant value, by connecting the gas sub system to a source of $CO_2$ under pressure such as 49.

Figure 2:
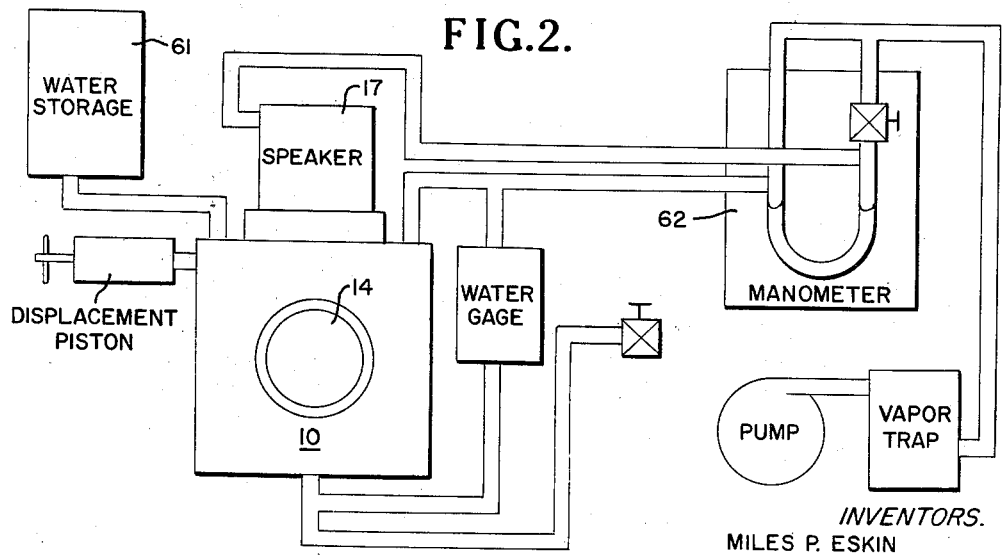
FIG. 2 is a diagrammatic view of an entire system used in operating the testing apparatus including the filling operation.

Referring particularly to FIG. 2 the overall system which includes both the sealed water-filled sub system and the pressurized gas sub system, there are numerous added pieces of apparatus which are necessary to the operation of the testing apparatus, some pieces of which are only used in filling the water sub system. A water storage tank 61 is located above the tank 10 so that a gravity flow supply of water is at hand for filling the tank. The filling of the water sub system must be done with de-aerated sea water. In order to prevent any air pockets forming under the speaker, the water sub system is filled under high vacuum. However, if a differential pressure of more than 0.2 p.s.i. occurs across the face of the speaker, it may cause rupture of the diaphragm 19. Therefore, not only the water chamber, but the entire system must be uniformly evacuated during fill. The method of evacuation and fill is illustrated in FIG. 2. Conduit lines are mainly flexible hose with ground union ends for couplings. After the filling operation is completed the conduit lines not necessary for the operation may be disconnected and in some cases reconnected as shown in FIG. 1.

The system is then pressurized to a given water depth using the pressure source of $CO_2$ gas. The equalizer keeps the gas, in the pressure gas sub system, which surrounds the speaker and exerts pressure on the back face of the speaker diaphragm, at a pressure which is constantly equal to the water pressure exerted on the face of the diaphragm. This applied gas pressure is also prevented from diffusing into the water of the water filled sub system by the equalizer. This is important because at any water depth the partial pressure of dissolved gas cannot substantially exceed the gas pressure existing at the surface of the water. Therefore, to create a realistic simulated sea bottom condition within the tank, the partial pressure of the dissolved gas must be kept close to atmospheric pressure.

This applied pressure may be left on the system for periods of approximately one year, and during this year frequent measurements may be made on the hydrophones being tested to determine the extent of their operational reliability, and any possible changes, due for example, to the time the microphones are submerged, in their operational characteristics.

The apparatus is intended to accurately calibrate the hydrophones with relation to voltage change due to change of sound intensity. The standard hydrophone is selected to produce $1/10$ volt with a sound intensity of one hundred (100) microbars of pressure and the readings of the hydrophones being compared when the output of the standard hydrophone reads .1 volt. This will initially calibrate the hydrophones being tested. The 100 microbars of pressure is maintained and readings taken at various times to determine the reliability of the hydrophones over a long period of time. Referring particularly to FIG. 3, the speaker 18 is connected to a source 51 of power and low frequency vibrations are set up in the tank 10. The intensity of the vibrations are varied until a reading of .1 volt is obtained on the standard hydrophone, which reading is obtained by the use of selective switches 52 and the oscilloscope 53 and voltmeter 54. By moving the selective switches, the behavior of the hydrophones to be tested may be shown on the oscilloscope and voltmeter illustrated and compared with that of the standard hydrophone.

Through the use of this apparatus, hydrophones may be tested over a long time interval, approximately one year, and their reliability established. They may be calibrated both for initial performance and for performance at various times during the year so that when put in mines at sea bottom they may be relied upon to operate dependably and accurately.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An underwater environmental simulation apparatus for testing hydrophones under conditions existing at a desired depth under the surface of a body of water for known periods of time, the apparatus comprising; a sealed water system, said water system including a water filled tank containing the hydrophones to be tested, a sound source connected to said tank in such a manner as to subject the hydrophones therein to vibrations produced by said sound source, a gas filled system, a variable gas pressure source connected to said gas filled system for establishing and maintaining a constant pressure in said gas filled system, and a pressure equalization means, including a pair of flexible diaphragms and a fluid sealed between said diaphragms, connected between said gas filled system and said water filled system, said pair of diaphragms communicating respectively with said gas filled system and said water filled system whereby the pressure in said gas filled system is transferred to said water filled system, said pressure equalization means being impervious to the transfer of gas from said gas filled system to said water filled system over a long period of time.

2. The underwater environmental simulation apparatus of claim 1 wherein said fluid sealed between said diaphragms in said pressure equalization means contains a constituent which will react with said gas as said gas permeates the adjacent diaphragm to form a precipitate.

3. The underwater environmental simulation apparatus of claim 2 wherein said flexible diaphragms are dome-shaped and are mounted in in-phase relationship to accommodate changes in volumetric capacity in said liquid filled system by flexing, and means connected to said liquid filled system and to said gas filled system for compensating for large changes in volumetric capacity of the liquid in said liquid filled system to prevent rupturing of said diaphragms.

References Cited in the file of this patent
UNITED STATES PATENTS
2,715,331  Yates et al. _____ Aug. 16, 1955

OTHER REFERENCES

Basic Methods for the Calibration of Sonar Equipment, Summary Technical Report of Div. 6, NDRC, Vol. 10, Washington, D.C., 1946, p. 116 and 117 relied upon.